F. PETERS & W. SCHMIDT.
COIN CONTROLLED VENDING MACHINE.
APPLICATION FILED JAN. 10, 1908.

947,755.

Patented Jan. 25, 1910.
8 SHEETS—SHEET 1.

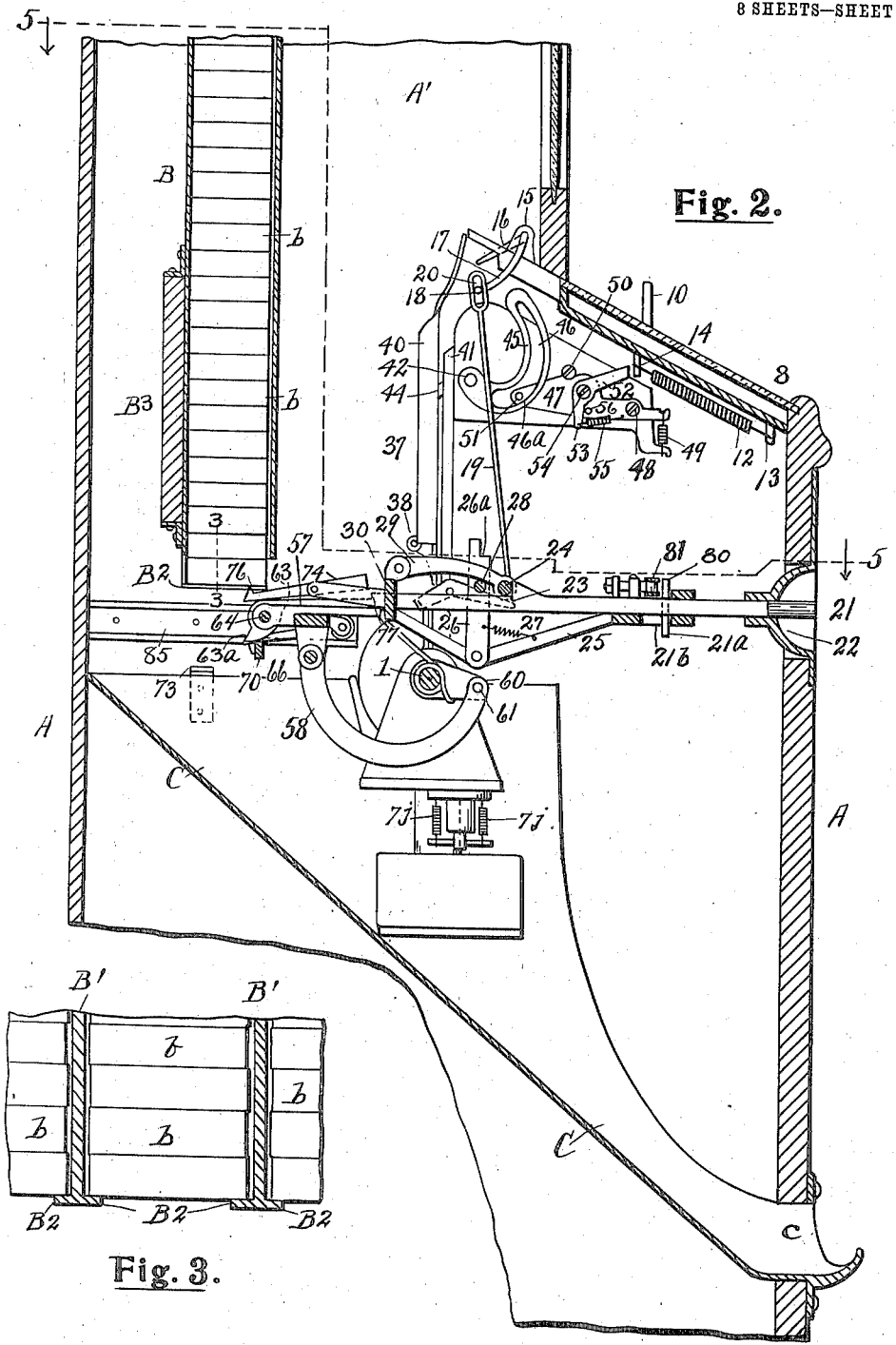

F. PETERS & W. SCHMIDT.
COIN CONTROLLED VENDING MACHINE.
APPLICATION FILED JAN. 10, 1908.

947,755.

Patented Jan. 25, 1910.

8 SHEETS—SHEET 4.

Witnesses
O. B. Baenziger.
Alecia Townsend.

Inventors
Frederick Peters.
William Schmidt.
By Parker & Burton
Attorneys

F. PETERS & W. SCHMIDT.
COIN CONTROLLED VENDING MACHINE.
APPLICATION FILED JAN. 10, 1908.

947,755.

Patented Jan. 25, 1910.
8 SHEETS—SHEET 5.

Witnesses
O. B. Baenziger
Clara Townsend

Inventors,
Frederick Peters
William Schmidt

By Parker & Burton
Attorneys

F. PETERS & W. SCHMIDT.
COIN CONTROLLED VENDING MACHINE.
APPLICATION FILED JAN. 10, 1908.

947,755.

Patented Jan. 25, 1910.

8 SHEETS—SHEET 6.

Witnesses
O. B. Baenziger
Alecia Townsend,

Inventors
Frederick Peters
William Schmidt
By Parker & Burton
Attorneys

F. PETERS & W. SCHMIDT.
COIN CONTROLLED VENDING MACHINE.
APPLICATION FILED JAN. 10, 1908.
947,755.
Patented Jan. 25, 1910.
8 SHEETS—SHEET 7.
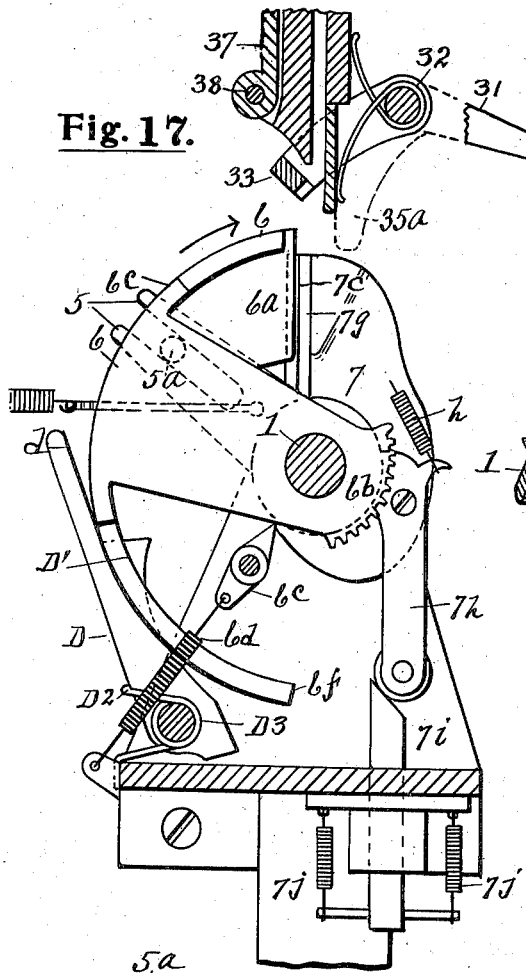
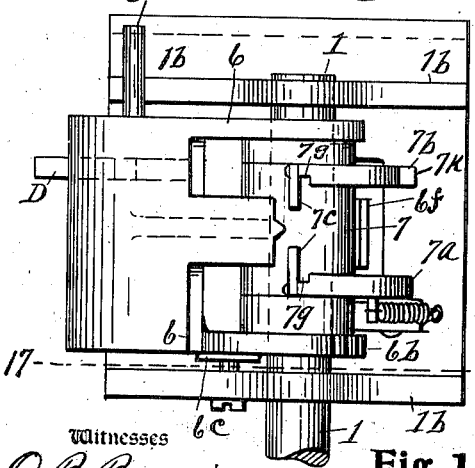
Fig. 17. Fig. 18. Fig. 19. Fig. 19a.
Witnesses
Inventors
Frederick Peters
William Schmidt
By Parker & Burton
Attorneys F. PETERS & W. SCHMIDT.
COIN CONTROLLED VENDING MACHINE.
APPLICATION FILED JAN. 10, 1908.
947,755.
Patented Jan. 25, 1910.
8 SHEETS—SHEET 8.
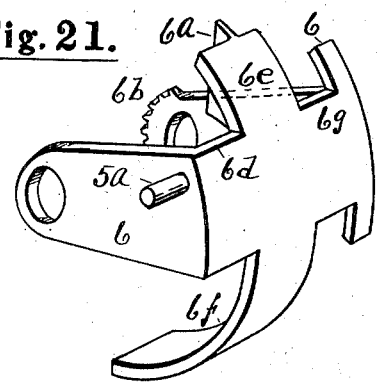
Fig. 21.
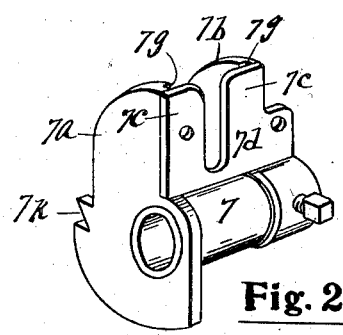
Fig. 22.
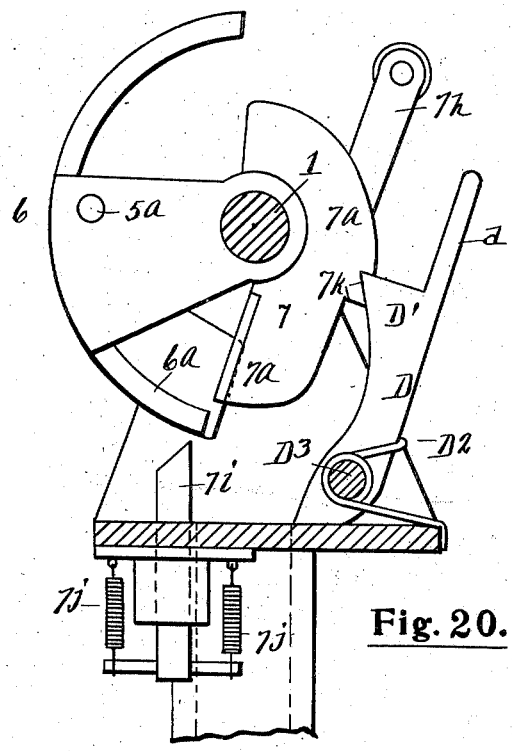
Fig. 20.
Fig. 24.
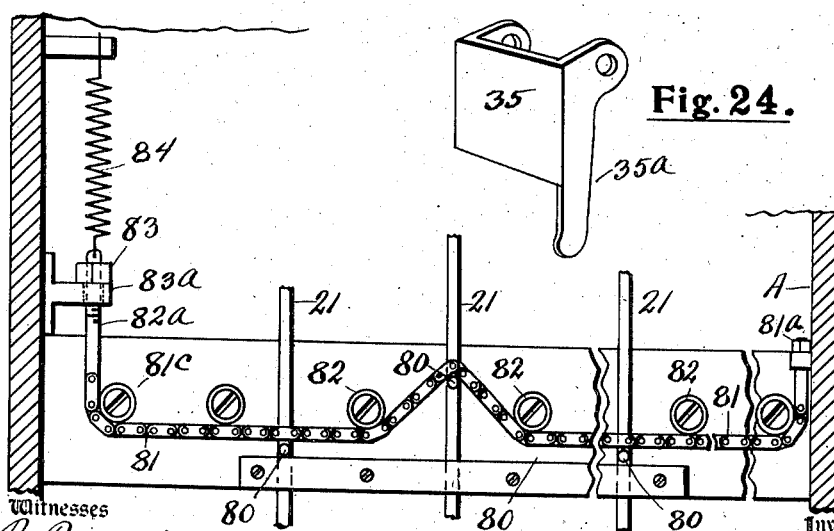
Fig. 23.
Witnesses
O. B. Baenziger.
Alicia Townsend.
Inventors
Frederick Peters.
William Schmidt.
By Parker & Burton Attorneys

UNITED STATES PATENT OFFICE.

FREDERICK PETERS AND WILLIAM SCHMIDT, OF DETROIT, MICHIGAN, ASSIGNORS TO MICHIGAN SALES COMPANY, OF DETROIT, MICHIGAN, A CORPORATION OF MICHIGAN.

COIN-CONTROLLED VENDING-MACHINE.

947,755.  Specification of Letters Patent.  Patented Jan. 25, 1910.

Application filed January 10, 1908. Serial No. 410,106.

*To all whom it may concern:*

Be it known that we, FREDERICK PETERS and WILLIAM SCHMIDT, citizens of the United States, residing at Detroit, county of Wayne, State of Michigan, have invented a certain new and useful Improvement in Coin-Controlled Vending-Machines, and declare the following to be a full, clear, and exact description of the same, such as will enable others skilled in the art to which it pertains to make and use the same, reference being had to the accompanying drawings, which form a part of this specification.

Our invention relates to vending machines, and the object of our invention is to provide an improved coin-controlled apparatus for vending a plurality of articles.

Figure 1:
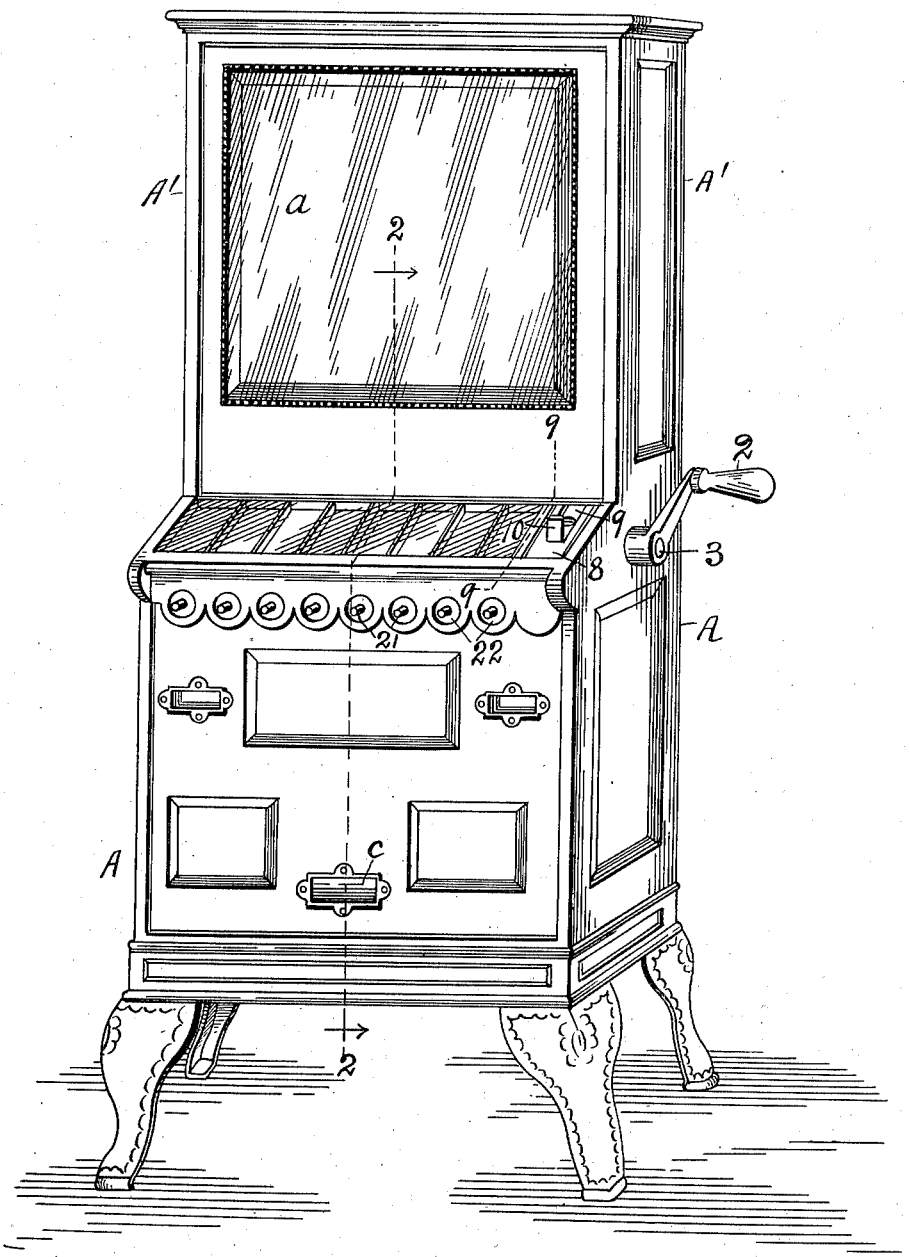
Figure 4:
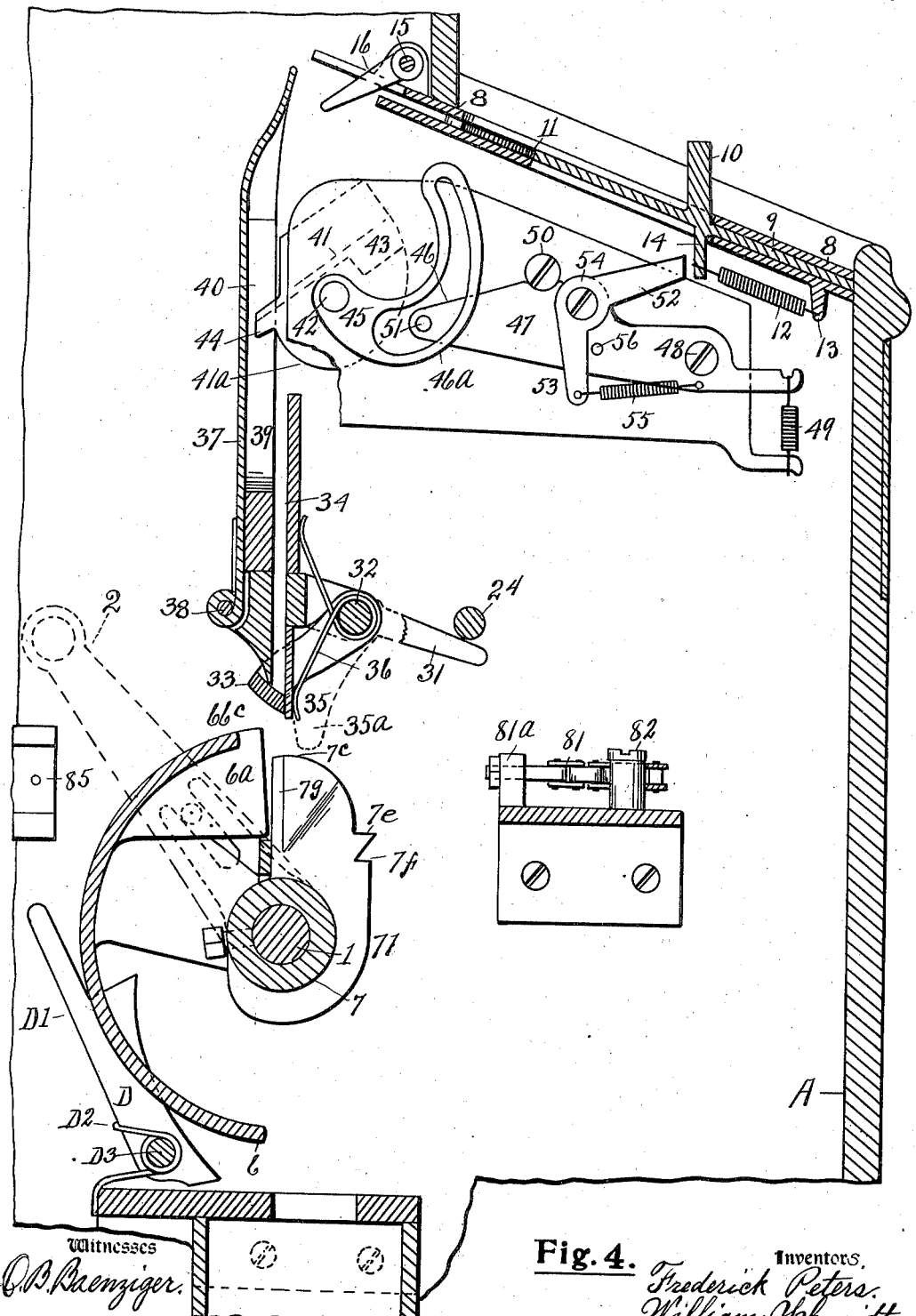
Figure 5:
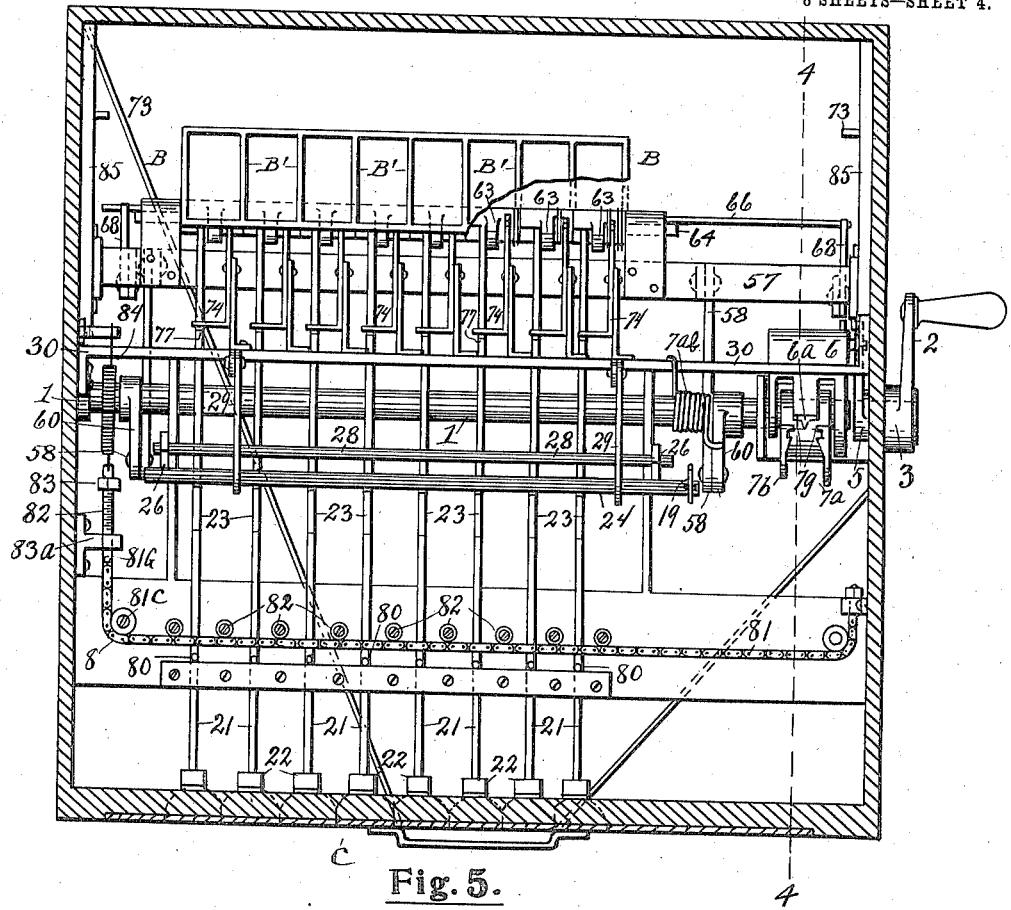
Figure 6:
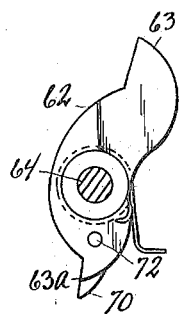
Figure 8:
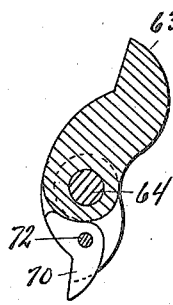
Figure 7:
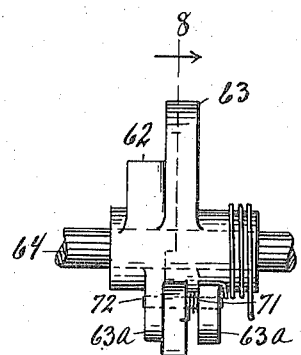
Figure 9:
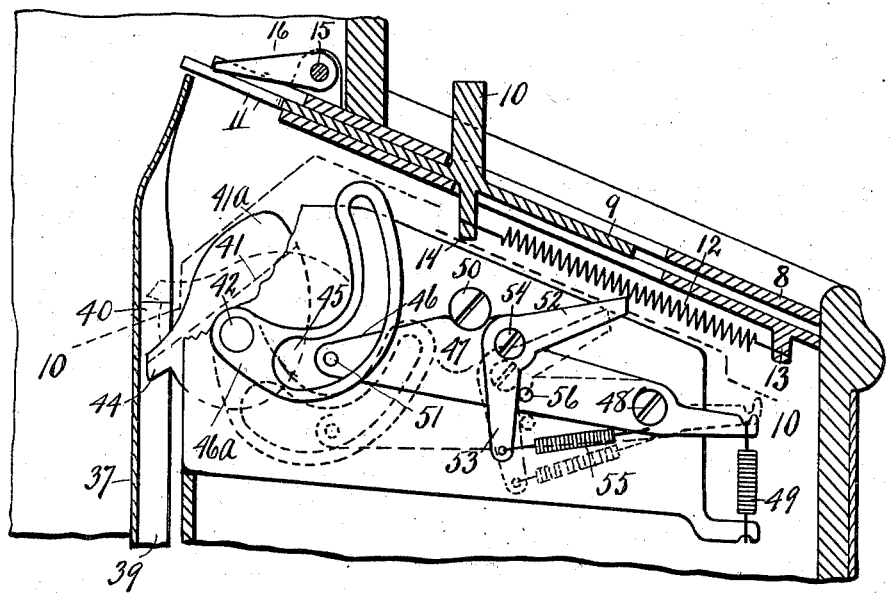
Figure 10:
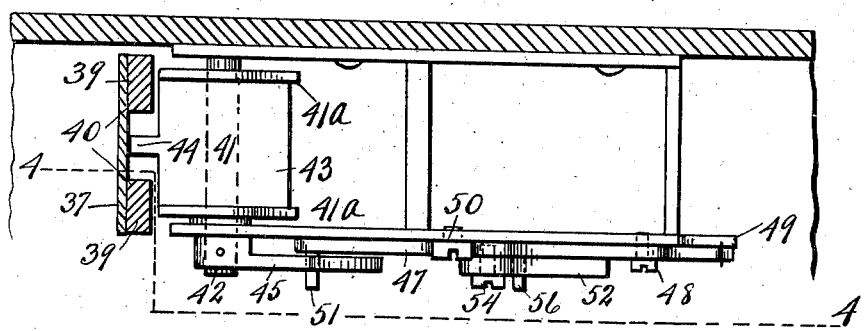
Figure 11:
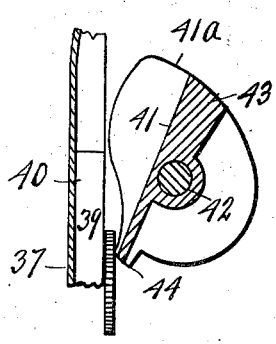
Figure 12:
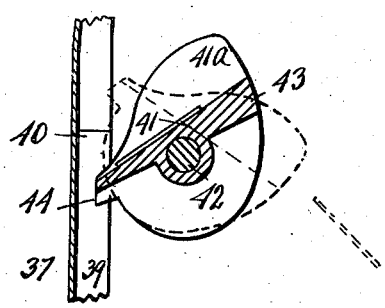
Figure 13:
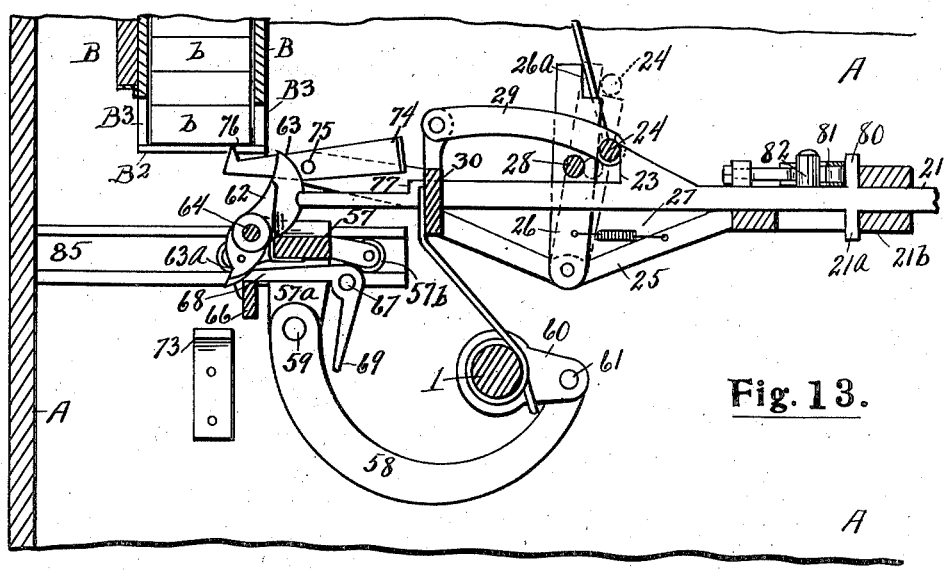
Figure 14:
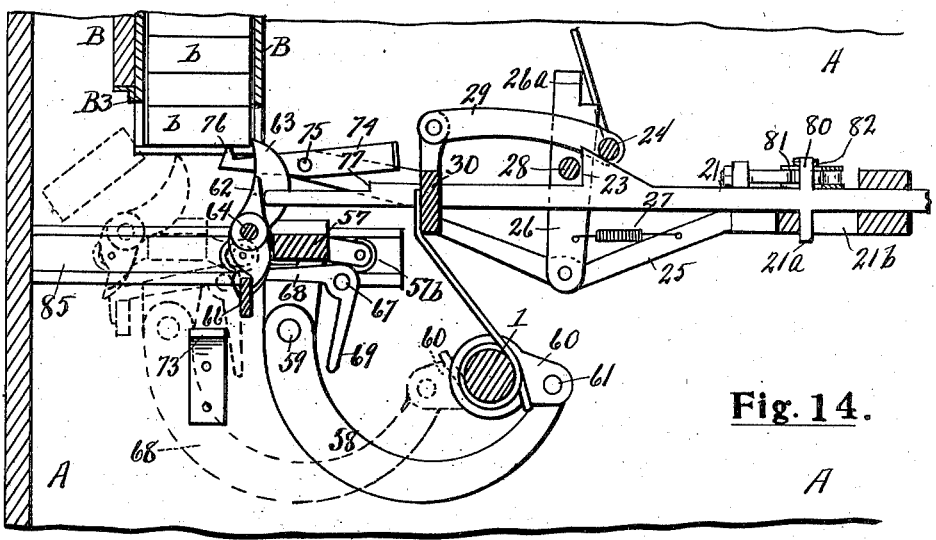
Figure 16:
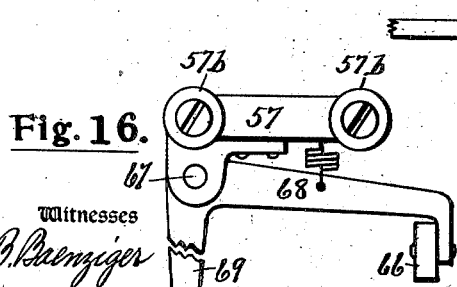
Figure 15:
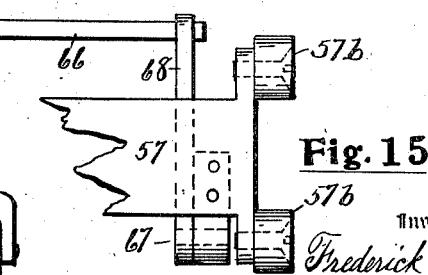

We accomplish this object in the device illustrated in the accompanying drawings, in which:

Figure 1, is a perspective view of an apparatus embodying our invention. Fig. 2, is a partial sectional view of the same in the plane indicated by the lines 2, 2 Fig. 1. Fig. 3, is a detail view showing the method of storing the articles to be sold. Fig. 4, is a partial sectional view in the plane indicated by the lines 4, 4 Figs. 5 and 19. Fig. 5, is a plan view of the entire apparatus, the casing being shown in section. Fig. 6, is a detailed view looking sidewise at the displacing apparatus. Fig. 7, is an elevation of the parts shown in Fig. 6 looking from the right of said figure. Fig. 8, is a sectional view on the lines 8, 8 Fig. 7. Fig. 9, is a sectional elevation of the slide by which the coin is fed to the machine and an elevation of the parts operated by said slide. This view is substantially a section in the plane indicated by the lines 9, 9 Fig. 1, the coin-feeding slide itself being shown in section on a plane farther to the right, the point of view being from the left of the plane indicated by the lines, 9, 9 Fig. 1. Fig. 10, is a plan view of the parts shown in Fig. 9, the slide and parts above the same being removed and the forward and side portions of the chute through which the coin falls vertically being shown in section, the section being taken at the point indicated by the broken line 10, Fig. 9. Fig. 11, is a detailed sectional view of the tilting platform upon which the coin falls when fed to the apparatus. Fig. 12, is a view similar to Fig. 11, showing the platform in a different position. Fig. 13, is a detail sectional view showing the displacer apparatus and the means for actuating the same. Fig. 14, is a view similar to Fig. 13, showing the parts in a different position. Fig. 15, is a detailed plan view of a part of the carriage carrying the displacer apparatus. Fig. 16, is a side view of the apparatus shown in Fig. 15. Fig. 17, is a side view of the apparatus for handling the coin after it has fallen from the coin chute, the mouth or delivery end of the latter being shown in section. Fig. 18, is a plan view of the apparatus for handling the coin after it has fallen from the coin chute. Fig. 19, is an elevation of the parts shown in Fig. 18, looking from the right of the latter. Fig. 19$^a$, is a perspective view of the coin retaining stirrup. Fig. 20, is an elevation of the parts shown in Fig. 19, looking from the right of the latter figure, and showing parts in a different position from that shown in Fig. 19. Fig. 21, is a perspective view of the hood forming a part of the apparatus shown in Fig. 20. Fig. 22, is a perspective view of the coin-carrying apparatus forming a part of the apparatus shown in Fig. 20. Fig. 23, is a sectional plan view of a portion of the frame, the pusher rods and apparatus whereby one and only one of said pusher rods may be operated at one time, and whereby said rods are retracted. Fig. 24, is a perspective view of the coin retaining disk or plate pivoted at the delivery end of the coin chute.

In Fig. 1, A, A, is a casing in the upper part of which the main part of the operating mechanism is contained. $A^1$, $A^1$, is an upward extension from the casing A, A, in which are contained the guideways, B, B, (Fig. 5) in which the various packages to be sold are placed to be fed to the machine. Between the parts A, A, and $A^1$, $A^1$, are glass-covered receptacles for exhibiting specimens of the articles to be sold opposite their respective guideways.

In the normal operation a coin is first placed in the machine in a prescribed way. A rod 21, opposite the article or package desired, is pressed in by the hand and then the crank 2, is turned a part of a revolution and returned to its first position, by which operation the coin is guided to its proper receptacle and the package delivered to the purchaser.

We will first describe the apparatus by which this result is accomplished in the normal and proper operation of the machine.

The following are the parts immediately employed in the normal operation of the machine.

8, is a guide-way, and 9, is a slide adapted to reciprocate in the guide-way 8.

10, is a lug or handle by which the guide 9, may be reciprocated by hand.

14, is a lug extending downward from the slide 9, through a slot in the lower wall of the guide 8.

12, is a spring secured at one end to a stationary lug 13, and at the other end to the lug 14, and adapted to retract the slide 9, when it has been pushed forward by hand.

11 (Fig. 4) is a coin receptacle substantially circular and of the size of the coin to be received say that of the ordinary penny.

16, is a lever arm pivoted to a shaft 15, and extending beyond the guide 8, and in the path of the coin as it emerges from said guide when the slide 9, is shoved forward; when the coin is pressed under the lever arm 16, it raises said arm, rocking the shaft 15; when the coin has fully emerged from the guide 8, it falls down upon the platform 41, and from that descends into the chute 34, and is delivered from the lower end of said chute, its two opposite edges coming in the vertical grooves, $7^g$, in the coin carrying apparatus 7, behind the plate $7^c$ (Fig. 22). The coin-carrying apparatus 7, is rigidly secured to the shaft 1, by a set screw or otherwise, which shaft rests in bearings and extends transversely of the machine, as indicated in Fig. 5, said shaft does not extend completely across the casing A, toward the right, as shown in said figure, but is supported in bearings $1^b$, $1^b$, (Figs. 18 and 19).

The crank 2, is secured to an arbor, or short shaft 3, resting in a bearing in the side of the casing A, and extending axially in line with the shaft 1, its inner end being adjacent or contiguous to the right hand end of said shaft.

5, is a lever arm on the inner end of the shaft 3, and having a fork in its outer end.

6, is a hood pivoted upon the shaft 1, and extending over the coin-carrying apparatus 7 (Figs. 17, 18 and 19).

$5^a$, is a pin extending laterally from the hood 6. The pin $5^a$, is engaged by the fork of the lever arm 5, so that by operating the crank 2, the hood 6, is turned about the shaft 1.

$7^{ab}$, (Fig. 5) is a spring acting to hold the shaft 1, in the position that will properly locate the coin-carrier 7, to receive the coin from the chute 34, (Fig. 4) and to return said coin-carrying apparatus to that position if it has been moved therefrom. The plate $7^c$, is slotted as distinctly indicated in Fig. 19, the slot being designated as $7^d$.

$6^a$, is a fin extending downward from the center of the hood 6, and adapted to pass through the slot $7^d$, when there is nothing in the grooves $7^g$; a coin falling into the carrier rests in the slots $7^g$, and when the hood 6, is turned by the crank 2, it carries the coin-carrying apparatus 7, with it against the resilient action of the spring $7^{ab}$, until said apparatus has been carried far enough so that a pawl D having a tooth $D^1$, and resiliently actuated by spring $D^3$, engages a tooth $7^k$, in a flange $7^a$, of said coin-carrying apparatus. The pawl D, now retains the coin-carrying apparatus in its adjusted position until the hood 6, is returned to its first position when a portion of said hood strikes against a lug $d$, upon the upward end of the pawl D, and forces the same backward and releases the coin-carrying apparatus 7, which is immediately returned to its first position by the spring $7^{ab}$.

In order that there shall be a complete stroke of the hood 6, at each actuation there are provided a series of teeth $6^b$, upon one of the pivoted flanges of the hood 6, and a pawl $6^c$, which is normally held in a position radial to the shaft 1, by a spring $6^d$, the pawl $6^c$, is engaged by the teeth $6^b$, in the forward movement of the hood 6, and is thereby prevented from being returned until the series of teeth $6^b$, have passed beyond the pawl $6^c$, when said pawl again resumes its normal position and is engaged again by the teeth $6^b$, when the hood is returned preventing anything but the reverse motion of said hood until the series of teeth have again passed beyond said pawl, when it again resumes its radial position. When the coin-carrying apparatus has been forced forward by the hood, as above described, the grooves $7^g$, extend downward and when the hood 6, commences to return the coin is released and drops from the grooves $7^g$, into the proper receptacle.

17, (Fig. 2) is an arm upon the rock shaft 15.

24, is a rod pivoted to the outer ends of the arms 29, which arms are at their other ends pivoted to a stationary support 30. The rod 24, extends horizontally above the series of push rods 21, hereinafter described.

19, is a connecting rod pivoted at its lower end to the bar 24, and at its upper end provided with an elongated slot 18, through which slot extends a pin 20, on the end of the arm 17.

26, are dogs pivoted at their lower ends to brackets 25, and at their upper ends provided with slots or detents 26ª.

27, is a spring acting to draw each of the dogs 26 toward the front of the machine.

When a coin is forced under the arm 16, and the shaft 15, is thereby rocked, the arm 17, co-acts with the connecting rod 19, and raises the rod 24, which is supported in its elevated position by the detent 26ª.

28, is a rod extending between the two dogs 26.

21, indicate the push rods, each of these is provided with a tooth 23. In its lower position the rod 24, is in front of each of the teeth 23, and prevents any of the push rods 21, from being forced inward. When the rod 24, is raised, as above described, any one of the rods 21, may be forced inward, but only one at a time, because of the following construction.

80, indicates rods or lugs, one of which extends vertically upward from each of the push rods 21.

82, indicates stationary rods located at equal distances laterally from the rods 80.

81, indicates a chain secured at one end to the side of the casing A, at 81ª, and extending between the series of rods 80, and 82, and around a pulley 81ᶜ, (Fig. 23) and connected to a reciprocating rod 82ª, the extent of the reciprocation of which may be adjusted by a nut 83, upon said rod striking against a stationary lug 83ª.

84, is a spring adapted to pull the rod 82ª, backward and hold the chain 81 taut and smooth. When one of the push rods 21, is forced forward a rod or lug 80, engages the chain 81, bending it between two of the rods or lugs 82, extending the spring 84, as indicated in Fig. 23, until the nut 83, strikes against the lug 83ª. The extent of this motion is just enough to accomplish the object of pushing in the rod 21; if an attempt is made to push in two of the rods 21, at the same time neither of said rods will go far enough in, to operate the mechanism hereinafter described and secure the object of the machine. The spring 84 acts to retract the rods 21, through the chain 81. As soon as the coin has passed by the arm 16, the arm again falls, being permitted to do so by the slot 18 in the connecting rod 19. When a push rod 21, is shoved forward at the inner end of its stroke a tooth 23, engages the rod 28, pushing the dogs 26, backward and releasing the rod 24, which then falls in position to engage the teeth 23, when the push rod is drawn back to its first position.

The guideways B, B, are completely walled in except at their lower ends for the thickness of one of the packages to be vended and here the front and back walls are cut away and there are provided ways B² (Fig. 3) at their lower ends which support the lower package in position to be shoved out at the back of the ways.

57 is a carriage extending across the casing A, in front of the series of rods 21, and adapted to reciprocate in ways 85, on the ends of the case. This carriage is provided at its ends (Figs. 15 and 16) with friction rollers 57ᵇ, and is provided also with pivoted arms 68, pivoted at their ends at 67, to the carriage 57 66 (Figs. 5 and 15) is a rod extending between the free ends of the arms 68. The arms 68, and the rods 66, are resiliently held in their highest position by a spring not shown.

69, (Figs. 13, 14, 16) is an arm extending from each of the arms 68, in substantially a vertical direction downward.

Upon the carriage 57, at its rear edge are pivoted a number of displacing apparatus, one opposite to each of the guideways B, in which are placed the packages to be vended. One of these displacing apparatus is shown in detail in Figs. 6, 7, 8, in which 63, is a hook projecting above the rest of the apparatus.

62, is a lug against which an inner end of the push rod 21, impinges.

63ª, is a hook extending below the pivot 64, of the apparatus.

70, is a click or pawl pivoted to the apparatus below its pivotal point 64, and having the function hereinafter described.

71, is a coiled spring acting to hold the hook 63, in its forwardly inclined position as shown in Fig. 13. In this position the hook 63, passes freely under the guideways B, and the lower package b, in said guideways; when the rod 21, is pushed in to the limit of its stroke it strikes against the lug 62, and pushes the displacing apparatus into the position shown in Fig. 14, in which position the hook 63, is raised so that it shall contact the lowest package in a guideway B, and displace said package as indicated in dotted lines in Fig. 14. The hook 63, is held in its elevated position by the bar 66, engaging the hook 63ª, as indicated in the last named figure.

60, is a lever arm secured to the shaft 1.

58, is a curved connecting rod pivoted at 59, to the carriage 57, and at 61, to the outer end of the lever arm 60.

When the shaft 1, is turned by the crank 2, as above described the carriage 57, is forced forward and if the hook 63, is in the elevated position shown in Fig. 14, it displaces the lower package in a guideway B, as indicated in said figure. As the carriage 57, moves forward the depending arm 69, strikes against a stationary lug 73, carrying the arm 68, downward and the bar 66, below the hook 63ª, thus releasing the displacing apparatus and allowing the spring 71, to return it to the position shown in Fig. 13, or in dotted lines in Fig. 14. The pawl 70, pivoted at 72, permits the hook 63, to return to its normal position as soon as the bar 66, falls below the lower end of the hook 63ª, but when the push rod 21, forces the hook 63, into its highest position it pushes the cross bar 66, not only below the lower end of the arm 68ª, but below the lower end of the pawl 70, so that any other displacing apparatus that might be in its elevated position would be positively and certainly released.

It has been above described how the coin falls into the slots 7ᵍ, in the coin-carrying apparatus, locks said apparatus and the hood 6, so that when the crank 2, is manipulated carrying the hood 6, with it, the coin-carrying apparatus 7, is also rotated carrying with it the shaft 1, which through the arms 60, and connecting rod 68, push the carriage 57, forward as above described. Should all of the packages $b$, be exhausted from one channel or guideway B, the push rod 21, adjacent to such channel or guideway is locked by a pawl 74, interposing itself in front of a shoulder 77, on the corresponding push rod 21. When the packages fill a channel or guideway the lowermost one rests upon a tooth 76, and holds the pawl 74, out of engagement with the shoulder 77, (Figs. 13 and 14); the weight of the pawl is sufficient to cause it to fall in position to lock the adjacent push rod when it is not held out of engagement by a package in the guideway. Should the operator put the proper coin in the machine and then manipulate the crank 2, without pressing any one of the push rods 21, the coin is returned by means now to be described, and in the following manner: 33, (Figs. 4, 17 and 19ª) is a stirrup pivoted to a stationary support at 32, and normally interposed in the passage of coin chute 34, at the delivery end thereof, so as to prevent a coin from falling from said chute (Fig. 4); when, however, the rod 24, falls to its lower position it strikes against the arm 31, connected with the stirrup 33, and forces said stirrup to a position which leaves the coin chute free (Fig. 17) 35 (Figs. 24, 4, 17) is a plate pivoted at 32, and adapted to co-act with the stirrup 33, to close the end of the chute 34. The plate 35, forms the lower part of the front wall of the chute 34. 35ª, is a lug extending downward from the plate 35, at one side thereof.

When the coin is placed in the machine, as above described, the rod 24, is lifted and is held in its raised position by the dog 26, thus permitting the stirrup 33, to take the position shown in Fig. 4, and the coin descends in the chute 34, and rests upon the said stirrup in the delivery end of said chute. Now when the crank 2, is manipulated the hood 6, is turned, the projecting portion 6ᵉ (Fig. 21) of said hood passes under the delivery end of the chute 34, and a shoulder 6ᵇ, on said hood then strikes against the lug 35ª, forcing the plate forward and away from the stirrup 33, and allowing the coin to fall upon the upper surface of the hood 6, or projection 6ᵉ, thereof, and the coin slides from said projection toward the front of the machine, the chute C and is delivered in a well understood manner at a place where it is accessible to the operator.

Of course, the coin not having been interposed between the hood and the coin-carrying apparatus 7, the latter is not carried around with the hood and the shaft 1, is not operated to reciprocate the carriage 57.

7ⁱ, is a rod having a slanting surface at its upper end and held in an elevated position by springs 7ᵏ. When the coin-carrying apparatus 7, is rotated, as above described, the end of the pawl 7ʰ, contacts the upper end of the rod 7ⁱ, which interposes a considerable resistance to the motion of said coin-carrying apparatus. This is sufficient so that the fin 6ª, on the hood 6, bends the slug and forces it out of the slots 7ᵍ, on to the carrier 7, releasing said carrier from engagement with the hood 6, and throwing the bent slug into a chute that carries it to a proper receptacle where it may be removed from the machine.

We provide for discarding magnetic material or material that is lighter than the coin appropriate to the machine and at the same time for cleaning out the entrance to the chute 34, at each operation of the slide 9, by the following means and in the following manner: 41, is a tilting platform or plate upon which the coin drops from the slide 9. 45, is an arm secured upon the shaft 42, of the platform 41. The arm 45, is provided with a slot 46. The platform or plate 41 is provided with side flanges 41ª, and is weighted by the arm 45, and a special enlargement 43, so that the appropriate coin falling upon it shall tilt said platform by its weight and slide into the chute 34. The platform 41, is provided with a nose 44, which extends across the passageway in the chute and into a narrow slot at the opposite side of said passageway. 37, is a plate pivoted at 38, and carrying a magnet 39, which has its poles 40, located just above the plate 41. 47 (Figs. 4, 9, 10, 2) is a lever pivoted to a stationary pivot 48. 50, is a stop to limit the upward motion of the left-hand arm of the lever 47. 49, is a spring adapted to hold the lever against the stop 50, or return it to that position if it has been forced therefrom. 51, is a pin extending from the end of the left-hand arm of the lever 47, into the slot 46, in the arm 45. The slot 46, is enlarged at 46ª, so as to allow a considerable motion of the arm 45, and plate 41, without striking against the pin 51, so that when the plate 41, is tilted or oscillated by the proper coin the necessary motion to deliver said coin into the chute 34, is permitted without interference by the pin 51. 52, 53, is a bell crank lever pivoted to the lever 47, at 54. 56, is a stop upon the lever 47, interposed in the path of travel of the arm 53. 55, is a spring secured at one end to the lever 47, and at the other end to the arm 53, and acting to resiliently hold said arm against the stop 56, and the arm 52, of said bell crank lever in the path of travel of the lug 14, depending from the slide 9. When the slide 9, is forced forward, as above described, it contacts the end of the arm 52, forcing the left-hand arm of the lever 47, downward which rotates the shaft 42, because of the arm 45, striking against the pin 51, thus rotating the plate 41, as indicated in dotted lines in Fig. 12. The action of said plate when delivering a proper coin into the chute is shown in Fig. 11. See also dotted lines in Fig. 9. When the lug 14, has passed the arm 52, the lever 47, is returned to its first position by the spring 49, and when the slide 9, is drawn back by the spring 12, it passes the arm 52, freely, the spring 55, permitting the bell crank lever 52, 53, to turn about the pin 54, to permit the passage of the lug 14, in this direction. Thus, if any light substance, paper or an aluminum disk has fallen upon the platform 41, it will be discharged at the rear end of said platform, as indicated by the dotted lines in Fig. 12, and will be conducted by a proper trough to a position to be removed from the machine.

If a slug of magnetic material has fallen upon the plate 41, it will be attracted by the poles of the magnet 39, and when the plate 41, is oscillated, as just described, the nose 44, will strike against said slug and force it away from the magnet and out of the machine, as above indicated for light articles. The nose 44, also serves to clear the mouth of the chute 34, at each backward oscillation of the plate to remove paper or other similar material that may have been placed in the machine.

The plate may, of course, be pivoted upon the opposite side of the chute to that shown, the coin delivery mechanism being extended over the chute 34, to deliver the coin to said plate in the new position. This would have the advantage of delivering the coin against instead of with the incline of said plate.

What we claim is:

1. The combination of a plurality of push rods, lugs upon said push rods, a series of stationary lugs, a flexible member extending between the stationary lugs and the lugs upon said push rods, said flexible member being adapted to be bent the required amount for the purpose described.

2. The combination of a plurality of push rods, lugs upon said push rods, a series of stationary lugs, a flexible member extending between the stationary lugs and the lugs upon said push rods, and means for adjusting the amount said flexible member may be bent.

3. The combination of a plurality of push rods, lugs upon said push rods, a series of stationary lugs, a flexible member extending between the stationary lugs and the lugs upon said push rods, and means for holding said flexible member taut and returning it to its taut condition.

4. The combination of a plurality of push rods, lugs upon said push rods, a series of stationary lugs, a flexible member extending between the stationary lugs and the lugs upon said push rods, a resilient member adapted to hold said flexible member taut and return it to its taut condition, and means for adjusting the extent of motion of said resilient member.

5. The combination of a carriage, a plurality of displacing apparatus on said carriage, each being normally in an inoperative position, means for placing said displacing apparatus in an operative position and means whereby the placing of one of said displacing means in an operative position causes any other of said displacing apparatus that may be in an operative position to return to its inoperative position.

6. The combination of a carriage, a displacing apparatus on said carriage consisting in part of a pivoted hook 63, normally turned to an inoperative position, a part adapted to be manipulated to turn said hook to an operative position, means for reciprocating said carriage, means for securing said hook in its operative position and for releasing the same and returning it to its inoperative position.

7. The combination of a carriage, a plurality of displacing apparatus on said carriage, each consisting in part of a pivoted hook 63 normally turned to an inoperative position, a part adapted to be manipulated to turn said hook to an operative position, a part adapted to engage each of said displacing apparatus to hold its hook in an operative position, each of said displacing apparatus being adapted to force said engaging means beyond its engaging position, when said displacing mechanism is actuated to turn its hook to an operative position.

8. The combination of a carriage, a plurality of displacing apparatus on said carriage, each consisting in part of a pivoted hook 63, provided with an engaging tooth and normally turned to an inoperative position, a part adapted to be manipulated to turn said hook to its operative position, a pawl adapted to engage the tooth of each of said hooks to hold it in an operative position, and a part 70 pivotally connected to said hook, forming an extension of said tooth adapted to turn freely to permit the engagement of said tooth and pawl, but restrained from turning in the other direction.

In testimony whereof, we sign this specification in the presence of two witnesses.

FREDERICK PETERS.
WILLIAM SCHMIDT.

Witnesses:
SELMA GUNDLACH,
ELLIOTT J. STODDARD.